United States Patent Office 2,937,179
Patented May 17, 1960

2,937,179

PROCESS FOR PHENYLIMIDAZOLINO[1,2-a]PIPERIDINES

Seymour L. Shapiro, Hastings on Hudson, Louis Freedman, Bronxville, and Harold Soloway, Yonkers, N.Y.

No Drawing. Application April 9, 1958
Serial No. 727,259

4 Claims. (Cl. 260—293)

This invention is concerned with a novel process for the preparation of 2-phenylimidazolino[1,2-a]piperidines and related compounds. In particular, it is the object of this invention to prepare compounds of the structure

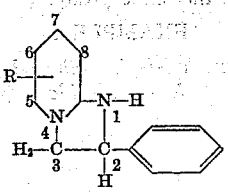

wherein R is hydrogen and methyl, as intermediates in the preparation of new pharmaceuticals. Such projected uses include substitution at the $N_1$ position (numbering of the imidazolino[1,2-a]piperidine ring system is in accordance with Patterson and Cappell, Ring Index, page 122, No. 765, with benzoyl and substituted benzoyl groups for use as anesthetic agents, with dialkylamino alkyl groups for antihistamine and tranquilizing agents, and with ethylene chlorbromide for adrenergic blocking agents. Additional and useful variants applicable to the preparation of new and useful organic compounds will be apparent to those skilled in the art.

The synthetic route used in the preparation of these important intermediates is shown in Scheme I.

SCHEME I

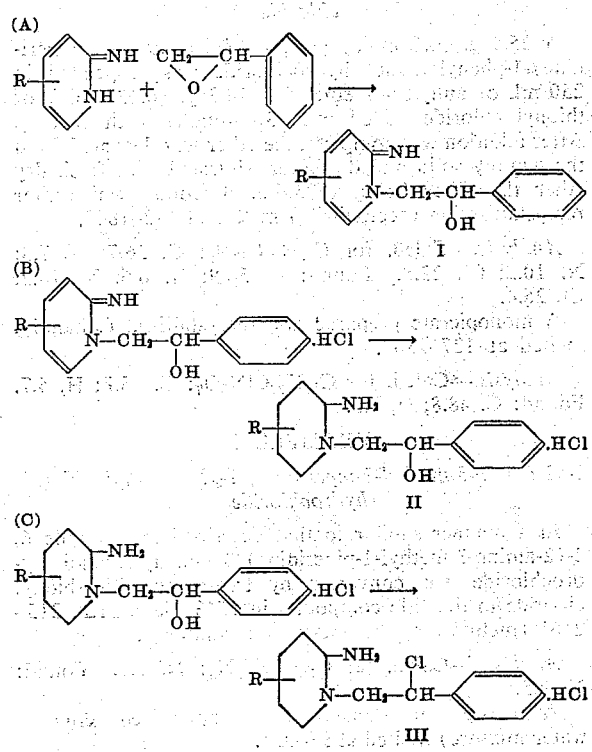

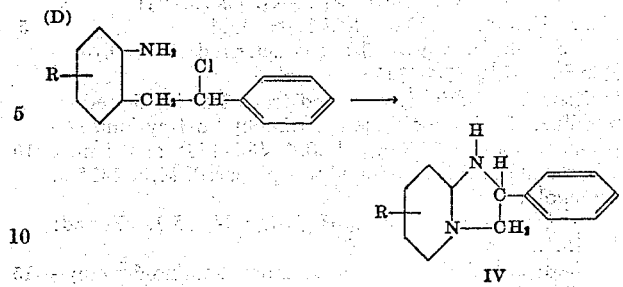

In the reaction, the 2-aminopyridine reacts in its imino form at the azine nitrogen with styrene oxide to yield the 2-(2-imino-1,2-dihydro-1-pyridine)-1-phenylethanol (I). These compounds are converted to their hydrochlorides and are reduced under hydrogen with rhodium on carbon as a catalyst to yield the 2-(2-amino-1-piperidine)-1-phenylethanol hydrochloride (II). (For structure proof of the compounds and the importance of the use of the hydrochloride of I in the reduction, refer to Example 4 below.) Conversion to the chloride III, 2-(2-amino-1-piperidine)-1-phenylethyl chloride hydrochloride, is effected by treatment of II with thionyl chloride. The resultant chloride III is dehydrohalogenated and cyclized to the corresponding 2-phenylimidazolino-[1,2-a]piperidine IV by treatment in an organic solvent or a mixed aqueous organic solvent in the presence of an acid acceptor such as sodium carbonate or sodium hydroxide. Other alkali metal hydroxides or carbonates as well as strong organic bases can also function as the acid acceptors.

The compounds in the series I–IV show interesting pharmacological properties particularly as diuretics, anti-inflammatory agents and ganglionic blocking agents.

The compounds herein described all have at least one asymmetric carbon atom. Thus, I has one, and where $R=CH_3$, II, III and IV have three. The exact stereochemistry of the groups has not been established, and the various stereochemical forms are to be considered within the purview of this invention.

The process and compounds of this invention will be more clearly understood from a consideration of the following specific examples which are given for the purpose of illustration only and are not to be construed as limiting the scope of the invention in any way. Temperatures where shown are in ° C.

EXAMPLE 1

*2-(2-imino-3-methyl-1,2-dihydropyridine)-1-phenylethanol*

A mixture of 24.0 g. (0.2 mole) of styrene oxide and 32.4 g. (0.3 mole) of 2-amino-3-methylpyridine was stirred together on a steam bath in a flask fitted with a reflux condenser. At the end of this period, the mixture was taken up in 200 ml. of boiling ethanol, filtered and permitted to crystallize. After refrigerating 3 hours filtration gave 22.4 g. (49%) of product, melting at 158–161° C.

Recrystallization from isopropyl alcohol, then acetonitrile, gave a 40% yield of product, melting at 166–167°.

*Analysis.*—Calcd. for $C_{14}H_{16}N_2O$: C, 73.7; H, 7.1; N, 12.3. Found: C, 73.7; H, 6.7; N, 11.8.

A monohydrochloride prepared in ethanol and recrystallized from a mixture of acetonitrile and n-propanol, melted at 185–186°.

*Analysis.*—Calcd. for $C_{14}H_{17}ClN_2O$: C, 63.5; H, 6.5; N, 10.6. Found: C, 63.9; H, 6.2; N, 11.1.

A monopicrate prepared and recrystallized (ethanol), melted at 136–137°.

*Analysis.*—Calcd. for $C_{20}H_{19}N_5O_8$: C, 52.5; H, 4.2; N, 15.3. Found: C, 52.6; H, 3.9; N, 15.0.

There was similarly prepared from 2-amino-4-methylpyridine, 2 - (2-imino-4-methyl-1,2-dihydro-1-pyridine)-1-phenylethanol in 13% yield, M.P. 159–160° (ethanol).

Analysis.—Calcd. for $C_{14}H_{16}N_2O$: C, 73.7; H, 7.1; N, 12.3. Found: C, 73.6; H, 7.2; N, 12.4.

The compound was also characterized as its hydrochloride, M.P. 230–231° (ethanol).

There was similarly prepared from 2-amino-5-methylpyridine, 2-(2-imino-5-methyl-1,2-dihydro-1-pyridine)-1-phenylethanol in 26% yield, B.P. 184–188° at 0.4 mm. The picrate of this compound was prepared, M.P. 243° d. (ethanol).

Analysis.—Calcd. for $C_{20}H_{19}N_5O_8$: N, 15.3. Found: N, 15.1.

There was similarly prepared from 2-amino-6-methylpyridine, 2 - (2-imino-6-methyl-1,2-dihydro-1-pyridine)-1-phenylethanol in 15% yield, B.P. 181–184° at 0.3 mm.

The picrate of this compound was prepared, M.P. 151–153°.

Analysis.—Calcd. for $C_{20}H_{19}N_5O_8$: C, 52.5; H, 4.2; N, 15.3. Found: C, 52.4; H, 4.4; N, 15.3.

EXAMPLE 2

2-(2-imino-1,2-dihydro-1-pyridine)-1-phenylethanol

A mixture of 12.0 g. (0.1 mole) of styrene oxide and 14.1 g. (0.15 mole) of 2-aminopyridine was heated on a steam bath with stirring for 6 hours. The viscous reaction mixture was taken up in 50 ml. of boiling ethanol, filtered and allowed to cool. After refrigerating for 3 hours, the crystalline product was filtered off, yielding 7 g. melting at 165–166°. Recrystallization from 200 ml. of ethyl acetate gave 5.5 g. (26%) melting at 166–169°.

Analysis.—Calcd. for $C_{13}H_{14}N_2O$: C, 72.9; H, 6.6; N, 13.1. Found: C, 73.3; H, 6.8; N, 13.0.

A monohydrochloride was prepared and recrystallized (isopropyl alcohol), M.P. 197–200° d.

Analysis.—Calcd. for $C_{13}H_{15}ClN_2O$: C, 62.3; H, 6.0; N, 11.2. Found: C, 63.0; H, 6.1; N, 11.9.

EXAMPLE 3

2-(2-amino-1-piperdine)-1-phenylethanol hydrochloride

A 24.9 g. (0.01 mole) portion of 2-(2-imino-1,2-dihydro-1-pyridine)-1-phenylethanol hydrochloride was dissolved in 225 ml. of ethanol and 2 g. of 5% rhodium on carbon added. The mixture was shaken in a Parr hydrogenator at an initial pressure of 4 atmospheres of hydrogen until the calculated quantity of hydrogen was taken up. After removal from the hydrogenator, filtration and removal of solvent, 25 g. of product was obtained which was recrystallized (methyl ethyl ketone and ethanol mixture), M.P. 184–185°.

Analysis.—Calcd. for $C_{13}H_{21}ClN_2O$: C, 60.8; H, 8.2; N, 10.9. Found: C, 61.1; H, 7.9; N, 10.6.

EXAMPLE 4

In the instance of the reduction shown in Example 3, if the free base instead of the hydrochloride is used for reduction, deamination proceeds during the hydrogenation according to the following equation

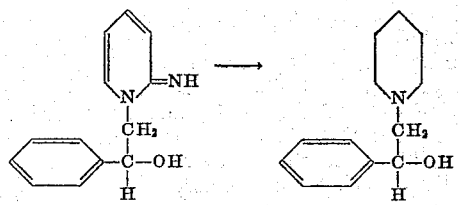

A 53 g. (0.25 mole) portion of 2-(2-imino-1,2-dihydro-1-pyridine)-1-pheynlethanol was dissolved in 200 ml. of ethanol, 5 g. of 5% rhodium on carbon added and the mixture shaken in a Parr hydrogenator at an initial pressure of 4 atmospheres of hydrogen. After 7 hours, 0.9 mole of hydrogen had been taken up and no further drop in pressure was noted. On removing the reaction mixture from the hydrogenator a strong odor of ammonia was observed.

The catalyst was filtered off and the solvent distilled from the filtrate at diminished pressure, yielding a product which crystallized on standing, giving 51.5 g. melting at 60–62°; recrystallized (hexane), M.P. 62–64°. A mixed melting point with an authentic sample of 2-piperidine-1-phenylethanol (melting at 65–67°) showed no change in melting point.

A hydrochloride prepared and recrystallized (acetonitrile) melted at 126–128°.

Analysis.—Calcd. for $C_{13}H_{20}ClNO$: N, 5.8. Found N, 5.8.

A picrate prepared and recrystallized (ethanol), melted at 135–137°.

Analysis.—Calcd. for $C_{19}H_{22}N_4O_8$: C, 52.5; H, 5.1; N, 12.9. Found: C, 52.9; H, 5.3; N, 13.0.

This reaction served to identify the mode of addition of the 2-amino-pyridines to styrene oxide, with the azine nitrogen attacking the oxide group.

EXAMPLE 5

2-(2-amino-3-methyl-1-piperidine)-1-phenylethanol hydrochloride

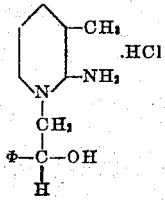

Reduction of 2-(2-imino-3-methyl-1,2-dihydro-1-pyridine)-1-phenyl-ethanol hydrochloride (as obtained in Example 1) following the hydrogenation procedure of Example 3, afforded the title compound in 29% yield, M.P. 187–188° (acetonitrile).

Analysis.—Calcd. for $C_{14}H_{23}ClN_2O$: C, 62.1; H, 8.6; N, 10.4. Found: C, 61.6; H, 8.8; N, 10.1.

EXAMPLE 6

2-(2-amino-1-piperdine)-1-phenylethyl chloride hydrochloride

A 25.5 g. (0.1 mole) portion of 2-(2-amino-1-piperidine)-1-phenylethanol hydrochloride was suspended in 250 ml. of anhydrous ether and 14.3 g. (0.12 mole) of thionyl chloride added over 30 minutes with stirring. After addition was complete, the ether was decanted from the gummy solid and the latter triturated with fresh dry ether, then filtered to give 25.6 g. of product which after recrystallization (acetonitrile) melted at 182–184°.

Analysis.—Calcd. for $C_{13}H_{20}Cl_2N_2$: C, 56.7; H, 7.3; N, 10.2; Cl, 25.8. Found: C, 56.9; H, 6.6; N, 10.2; Cl, 26.4.

A monopicrate prepared and recrystallized (ethanol), melted at 127–130°.

Analysis.—Calcd. for $C_{19}H_{22}ClN_5O_7$: C, 48.8; H, 4.7. Found: C, 48.8; H, 4.3.

EXAMPLE 7

2-(2-amino-3-methyl-1-piperidine)-1-phenylethyl chloride hydrochloride

In a manner similar to that described in Example 6, 2-(2-amino-3-methyl-1-piperidine)- 1 - phenylethanol hydrochloride was converted by treatment with thionyl chloride to the title compound in 25% yield, M.P. 215–216° (methyl ethyl ketone-ethanol mixture).

Analysis.—Calcd. for $C_{14}H_{22}Cl_2N_2$: N, 9.7. Found: N, 9.5.

A monopicrate prepared and recrystallized (ethanol-water mixture) melted at 98–99°.

*Analysis.*—Calcd. for $C_{20}H_{24}ClN_5O_7$: C, 49.9; H, 5.0; N, 14.5; Cl, 25.0. Found: C, 49.6; H, 5.6; N, 13.7; Cl, 25.0.

EXAMPLE 8

2-phenylimidazolino[1,2-a]piperidine

*Method A.*—Sodium carbonate, 12.7 g. (0.12 mole), was suspended in 150 ml. of refluxing benzene. To this was added dropwise with stirring, a solution of 9.3 g. (0.03 mole) of 2-amino-1-(2-chloro-2-phenyl)-ethylpiperidine hydrochloride in 100 ml. of ethanol over 1.5 hours. The reaction mixture was refluxed with stirring for 13 hours, cooled, filtered and the solvent distilled from the filtrate. The residual oil was extracted with ether, a small amount of solid filtered off and the ether evaporated from the filtrate to give 3.2 g. of oil which was distilled and yielded the product, boiling at 118–120° at 0.3 mm.

*Analysis.*—Calcd. for $C_{13}H_{18}N_2$: N, 13.9. Found: N, 13.6.

A picrate prepared and recrystallized (ethanol) melted at 176–178°.

*Analysis.*—Calcd. for $C_{19}H_{21}N_5O_7$: C, 52.9; H, 4.9; N, 16.2. Found: C, 53.5; H, 4.5; N, 15.9.

A p-nitrobenzamide was prepared by refluxing with p-nitrobenzoyl chloride in benzene. The product was isolated as the hydrochloride and recrystallized from a mixture of isopropyl alcohol and isopropyl ether. The p-nitrobenzamide hydrochloride melted with decomposition at 188–189°.

*Analysis.*—Calcd. for $C_{20}H_{22}ClN_3O_3$: C, 61.9; H, 5.7; N, 10.8. Found: C, 61.9; H, 5.6; N, 10.6.

*Method B.*—Sodium hydroxide, 4.0 g. (0.1 mole), was dissolved in 25 ml. of water and then added to 25 ml. of acetonitrile and a solution of 9.3 g. (0.03 mole) of 2-amino-1-(2-chloro-2-phenyl)-ethylpiperidine hydrochloride in 50 ml. of 50% aqueous acetonitrile was admitted over 1 hour. Stirring was continued for a total of 15 hours after addition was complete.

At the end of this period, an additional 50 ml. of water was added and the acetonitrile distilled out to yield a dark residue. This was extracted with five 20 ml. portions of ether, the extracts dried over anhydrous magnesium sulfate, then filtered and distilled. After removal of the ether, 1.5 g. (25%) of product was obtained, boiling at 113–116° at 0.2 mm.

In a similar manner, dehydrohalogenation and cyclization of compounds wherein $R=CH_3$ is effected.

It is to be understood that it is intended to cover all changes and modifications of the examples of the invention herein chosen for the purpose of illustration which do not constitute departure from the spirit and scope of the invention.

We claim:

1. The compound

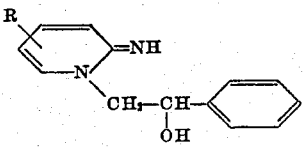

where R is a member of the group consisting of hydrogen and methyl.

2. The compound

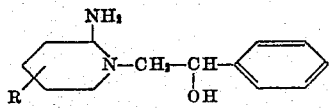

where R is a member of the group consisting of hydrogen and methyl.

3. The compound

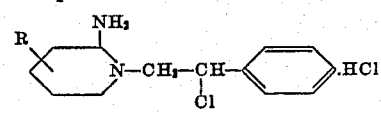

where R is a member of the group consisting of hydrogen and methyl.

4. The compound

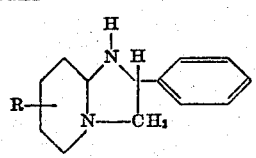

where R is a member of the group consisting of hydrogen and methyl.

References Cited in the file of this patent

Kondo: J. Pharm. Soc., Japan, vol. 57, pp. 397–403, abstracted from Chem. Abst., vol. 33, col. 2139 (1940).